United States Patent
Demon et al.

(10) Patent No.: US 11,987,086 B2
(45) Date of Patent: May 21, 2024

(54) AXLE ARRANGEMENT FOR AN AGRICULTURAL BALER

(71) Applicant: CNH Industrial America LLC, New Holland, PA (US)

(72) Inventors: Frederik Demon, Bruges (BE); Sven Monbaliu, Zuienkerke (BE)

(73) Assignee: CNH Industrial America LLC, New Holland, PA (US)

(*) Notice: Subject to any disclaimer, the term of this patent is extended or adjusted under 35 U.S.C. 154(b) by 652 days.

(21) Appl. No.: 17/252,538

(22) PCT Filed: Jun. 19, 2019

(86) PCT No.: PCT/EP2019/066160
§ 371 (c)(1),
(2) Date: Dec. 15, 2020

(87) PCT Pub. No.: WO2019/243406
PCT Pub. Date: Dec. 26, 2019

(65) Prior Publication Data
US 2021/0114428 A1    Apr. 22, 2021

(30) Foreign Application Priority Data
Jun. 20, 2018 (BE) .................... 2018/5422

(51) Int. Cl.
*A01F 15/08*     (2006.01)
*B60G 9/00*      (2006.01)
(Continued)

(52) U.S. Cl.
CPC .............. *B60G 11/04* (2013.01); *B60G 9/003* (2013.01); *B60G 21/067* (2013.01); *A01F 15/08* (2013.01);
(Continued)

(58) Field of Classification Search
CPC ......... A01F 15/08; B60G 11/04; B60G 9/003; B60G 21/067; B60G 15/06;
(Continued)

(56) References Cited

U.S. PATENT DOCUMENTS

| 1,747,902 A | 2/1930 | Marcum |
| 3,195,917 A | 7/1965 | Baldock |
(Continued)

FOREIGN PATENT DOCUMENTS

| DE | 7413733 U | 7/1974 |
| LU | 45524 A1 | 8/1964 |

OTHER PUBLICATIONS

International Search Report and Written Opinion for PCT application PCT/EP2019/066160, dated Aug. 26, 2019 (11 pages).

*Primary Examiner* — Thomas W Irvin
(74) *Attorney, Agent, or Firm* — Peter K. Zacharias; Rebecca L. Henkel; Rickard K. DeMille

(57) ABSTRACT

An axle arrangement for a baler includes: a first axle with a first end and a second end, the first end being coupled with the chassis by a first leaf spring and a first hydraulic cylinder, the second end being coupled with the chassis by a second leaf spring and a second hydraulic cylinder; a second axle with a first end and a second end, the first end being coupled with the chassis by a first leaf spring and a first hydraulic cylinder, the second end being coupled with the chassis by a second leaf spring and a second hydraulic cylinder; a first hydraulic line fluidly interconnecting the first hydraulic cylinder on the first axle with the first hydraulic cylinder on the second axle; and a second hydraulic line fluidly interconnecting the second hydraulic cylinder on the first axle with the second hydraulic cylinder on the second axle.

14 Claims, 5 Drawing Sheets

(51) Int. Cl.
*B60G 11/04* (2006.01)
*B60G 21/067* (2006.01)

(52) U.S. Cl.
CPC .... *B60G 2200/31* (2013.01); *B60G 2202/112* (2013.01); *B60G 2202/413* (2013.01); *B60G 2300/08* (2013.01)

(58) Field of Classification Search
CPC .......... B60G 2200/31; B60G 2202/112; B60G 2202/413; B60G 2300/08
See application file for complete search history.

(56) References Cited

U.S. PATENT DOCUMENTS

| | | | | |
|---|---|---|---|---|
| 4,619,467 A * | 10/1986 | Lafferty | ............... | B60G 21/067 267/24 |
| 4,700,972 A * | 10/1987 | Young | ............... | B60G 17/0195 280/5.521 |
| 4,717,170 A * | 1/1988 | Mounier-Poulat | ....... | B60G 9/00 280/683 |
| 5,556,115 A * | 9/1996 | Heyring | ............... | B60G 17/033 280/6.159 |
| 5,584,498 A * | 12/1996 | Danek | ................. | B60G 17/016 280/5.513 |
| 6,220,613 B1 * | 4/2001 | Franzini | ................ | B60G 21/06 280/5.506 |
| 7,350,793 B2 * | 4/2008 | Munday | ................. | B60G 21/06 280/124.157 |
| 7,686,309 B2 * | 3/2010 | Munday | ................. | B60G 21/06 280/5.506 |
| 8,261,869 B2 * | 9/2012 | Turco | .................... | B60G 21/106 296/190.07 |
| 8,342,280 B2 * | 1/2013 | Turco | ................. | B62D 33/0608 296/190.07 |
| 10,569,612 B2 * | 2/2020 | Bittner | ................. | B60G 17/0416 |
| 10,737,545 B1 * | 8/2020 | Dillenbeck | ............ | B60G 17/08 |
| 11,161,382 B2 * | 11/2021 | Monbaliu | ............. | B60G 5/047 |
| 11,364,760 B2 * | 6/2022 | Mater, Jr. | ............... | B60G 5/005 |
| 11,667,168 B2 * | 6/2023 | Monbaliu | ............ | A01D 89/002 56/341 |
| 2009/0199603 A1 | 8/2009 | Baldauf et al. | | |
| 2020/0022311 A1 * | 1/2020 | Monbaliu | ............. | B60G 11/46 |
| 2021/0252929 A1 * | 8/2021 | Monbaliu | ............. | B60G 9/003 |
| 2021/0268855 A1 * | 9/2021 | Monbaliu | ............. | B60G 9/027 |
| 2023/0097429 A1 * | 3/2023 | Monbaliu | ............ | B60G 15/067 280/6.157 |

\* cited by examiner

AXLE ARRANGEMENT FOR AN AGRICULTURAL BALER

BACKGROUND OF THE INVENTION

1. Field of the Invention

The present invention relates to agricultural balers, and, more particularly, to axle arrangements used with such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a feeding channel (also known as a "pre-compression chamber"). The packer unit forms a wad of crop within the feeding channel which is then transferred to a main bale chamber. (For purposes of discussion, the charge of crop material within the feeding channel will be termed a "wad", and the charge of crop material after being compressed within the main bale chamber will be termed a "flake"). Typically such a packer unit includes packer tines or forks to move the crop material from the pickup unit into the feeding channel. Instead of a packer unit it is also known to use a rotor cutter unit which chops the crop material into smaller pieces.

A stuffer unit transfers the wad of crop material in charges from the feeding channel to the main bale chamber. Typically such a stuffer unit includes stuffer forks which are used to move the wad of crop material from the feeding channel to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Large square balers typically include tandem axles to support the weight of the baler and the bales within the baler. The tandem axles are usually coupled to the chassis of the baler by way of an inverted "Y" or yoke arrangement at the ends of the axles, with the apex of the yoke being pivotally coupled to the chassis of the baler. This mechanical interconnection between the axles allows the axles to move together as the baler traverses over uneven ground.

An axle arrangement with mechanically interconnected tandem axles as described above works well to traverse uneven ground, but it can increase the overall height of the baler. For some applications, it may be desirable to use larger diameter tires on the baler, and the combination of the larger diameter tires and the typical mechanical interconnection between the axles would raise the baler too high off the ground.

What is needed in the art is an agricultural baler that can effectively traverse over uneven ground while at the same time allowing the use of different or larger diameter tires.

SUMMARY OF THE INVENTION

The present invention provides an agricultural baler with an axle arrangement in which the suspension cylinders on the first axle are fluidly connected with the suspension cylinders on the second axle in such a way that a virtual pivot point exists between the first and second axles as the baler traverses over uneven or rough ground.

The invention in one embodiment is directed to an agricultural baler including a chassis, a main bale chamber, and an axle arrangement coupled with the chassis. The baler is characterized in that the axle arrangement includes:
  a first axle with a first end and a second end, the first end being coupled with the chassis by a first leaf spring and a generally vertically arranged first hydraulic cylinder, the second end being coupled with the chassis by a second leaf spring and a generally vertically arranged second hydraulic cylinder;
  a second axle with a first end and a second end, the first end being coupled with the chassis by a first leaf spring and a generally vertically arranged first hydraulic cylinder, the second end being coupled with the chassis by a second leaf spring and a generally vertically arranged second hydraulic cylinder; and
  a hydraulic circuit fluidly interconnecting the first hydraulic cylinder on the first axle with the first hydraulic cylinder on the second axle, and fluidly interconnecting the second hydraulic cylinder on the first axle with the second hydraulic cylinder on the second axle.

In another embodiment of the invention, the hydraulic circuit creates a virtual pivot point between the first axle and the second axle, such that the first hydraulic cylinder on the first axle acts together with the first hydraulic cylinder on the second axle, and the second hydraulic cylinder on the first axle acts together with the second hydraulic cylinder on the second axle.

In another embodiment of the invention, the hydraulic circuit includes:
  a first hydraulic line fluidly interconnecting the first hydraulic cylinder on the first axle with the first hydraulic cylinder on the second axle; and
  a second hydraulic line fluidly interconnecting the second hydraulic cylinder on the first axle with the second hydraulic cylinder on the second axle.

In another embodiment of the invention, the baler includes a pickup unit and a feeding channel for receiving crop from the pickup unit. The feeding channel defines a structural member which is coupled with the chassis. The first leaf spring and the second leaf spring of the first axle are pivotally coupled with the feeding channel, and thereby indirectly coupled to the chassis by way of the feeding channel.

In another embodiment of the invention, the first axle is mounted rearwardly of the feeding channel, thereby lowering an effective axle height of the axle arrangement.

In yet another embodiment of the invention, the baler includes a rear structural member which is coupled with and extends downwardly from the chassis. The first leaf spring and the second leaf spring of the second axle are pivotally coupled with the rear structural member in a manner such that the second axle is mounted rearwardly of the rear structural member, thereby lowering an effective axle height of the axle arrangement.

In yet another embodiment of the invention, the first hydraulic line and the second hydraulic line are each oversized lines providing fast flow of hydraulic fluid between the respective hydraulic cylinders.

In yet another embodiment of the invention, the first hydraulic line and the second hydraulic line are each oversized lines providing the dual functionality of fast flow of hydraulic fluid between the respective hydraulic cylinders, and acting as an accumulator for hydraulic damping.

In yet another embodiment of the invention, the first hydraulic cylinder and the second hydraulic cylinder on the first axle have a first volumetric capacity, and the first hydraulic cylinder and the second hydraulic cylinder on the second axle have a second volumetric capacity. The first volumetric capacity can be the same as or different from the second volumetric capacity.

In a further embodiment of the invention, each said leaf spring is a generally horizontally arranged leaf spring.

In a further embodiment of the invention, each of the leaf springs provide lateral stabilization of the respective first axle or second axle.

In another embodiment of the invention, the axle arrangement has at least two axles (two, three, four, etc.), including the first axle and the second axle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
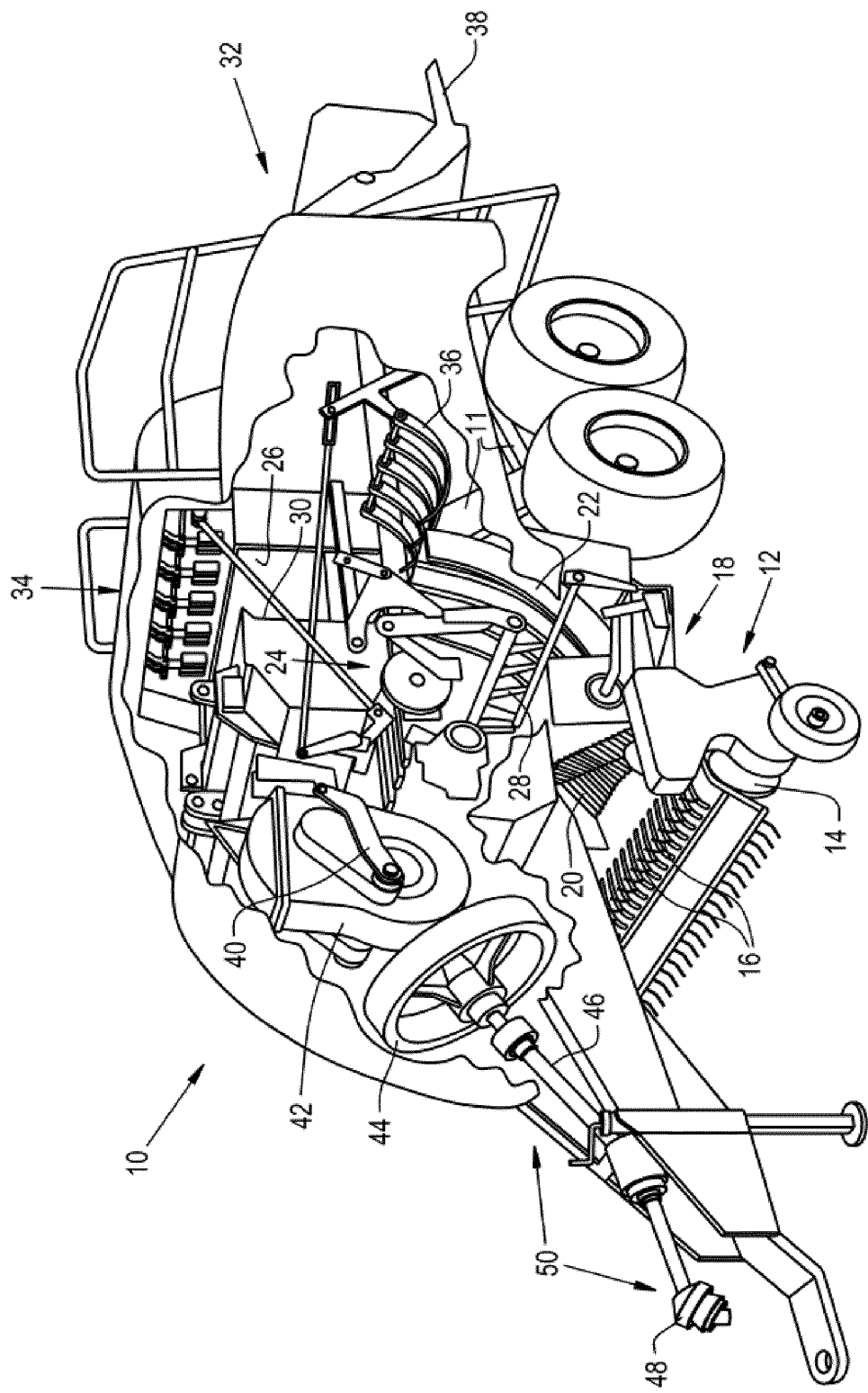
FIG. 1 is a perspective cutaway view showing the internal workings of a large square baler, which can include an axle arrangement of the present invention.
Figure 2:
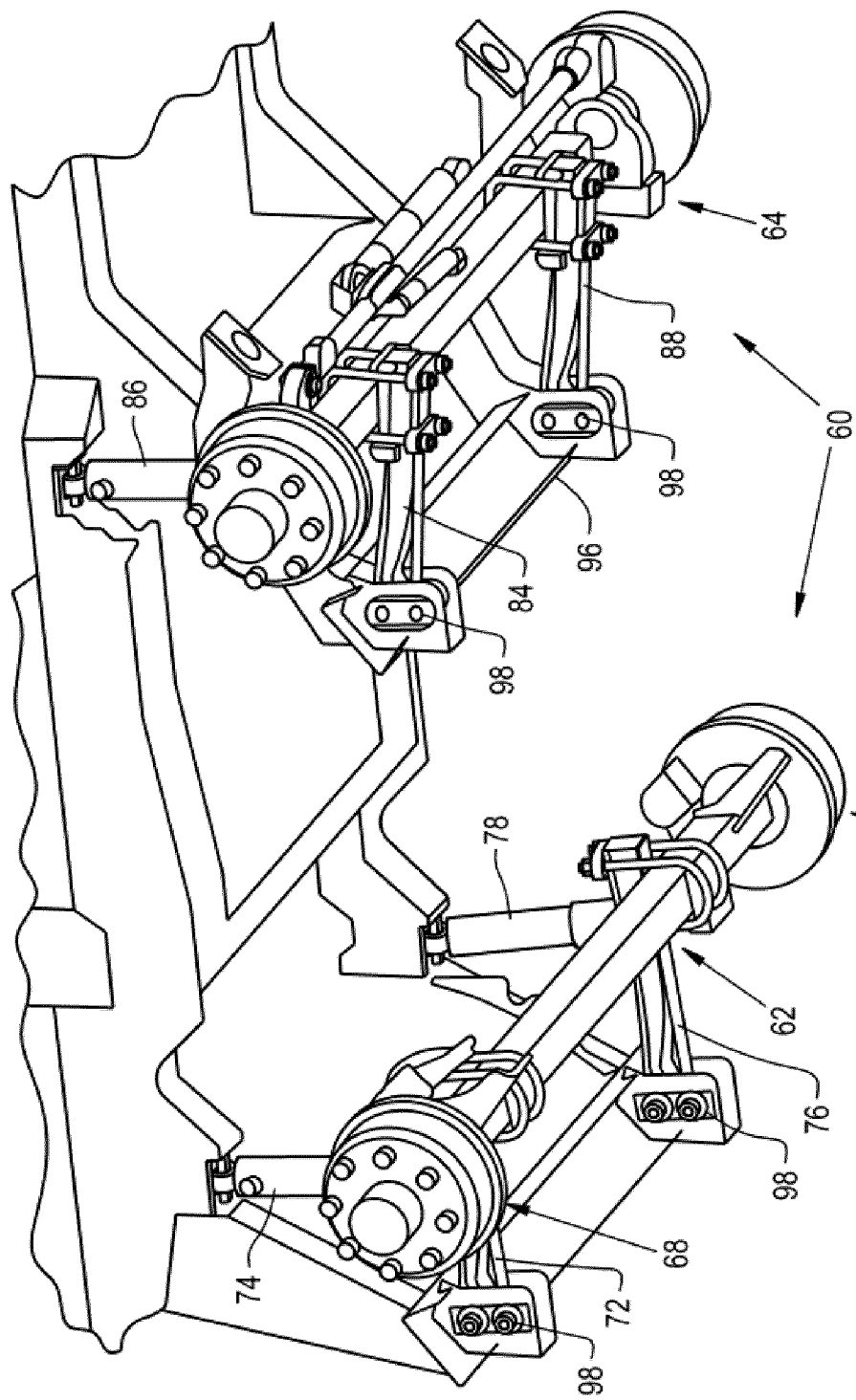
FIG. 2 is a perspective bottom view showing an embodiment of the axle arrangement of the present invention, which can be used on the baler shown in FIG. 1.
Figure 3:
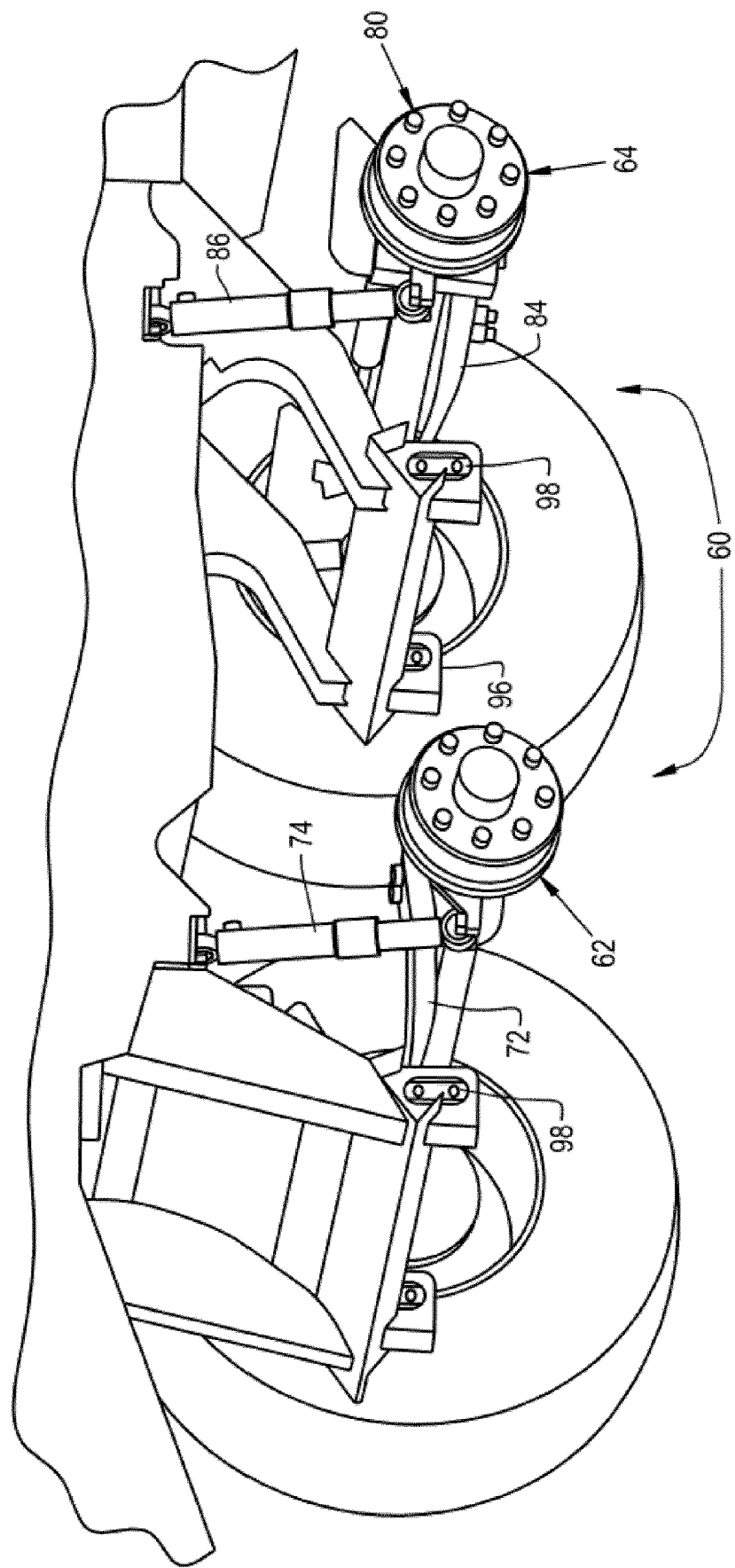
FIG. 3 is another perspective view of the axle arrangement shown in FIG. 2.
Figure 4:
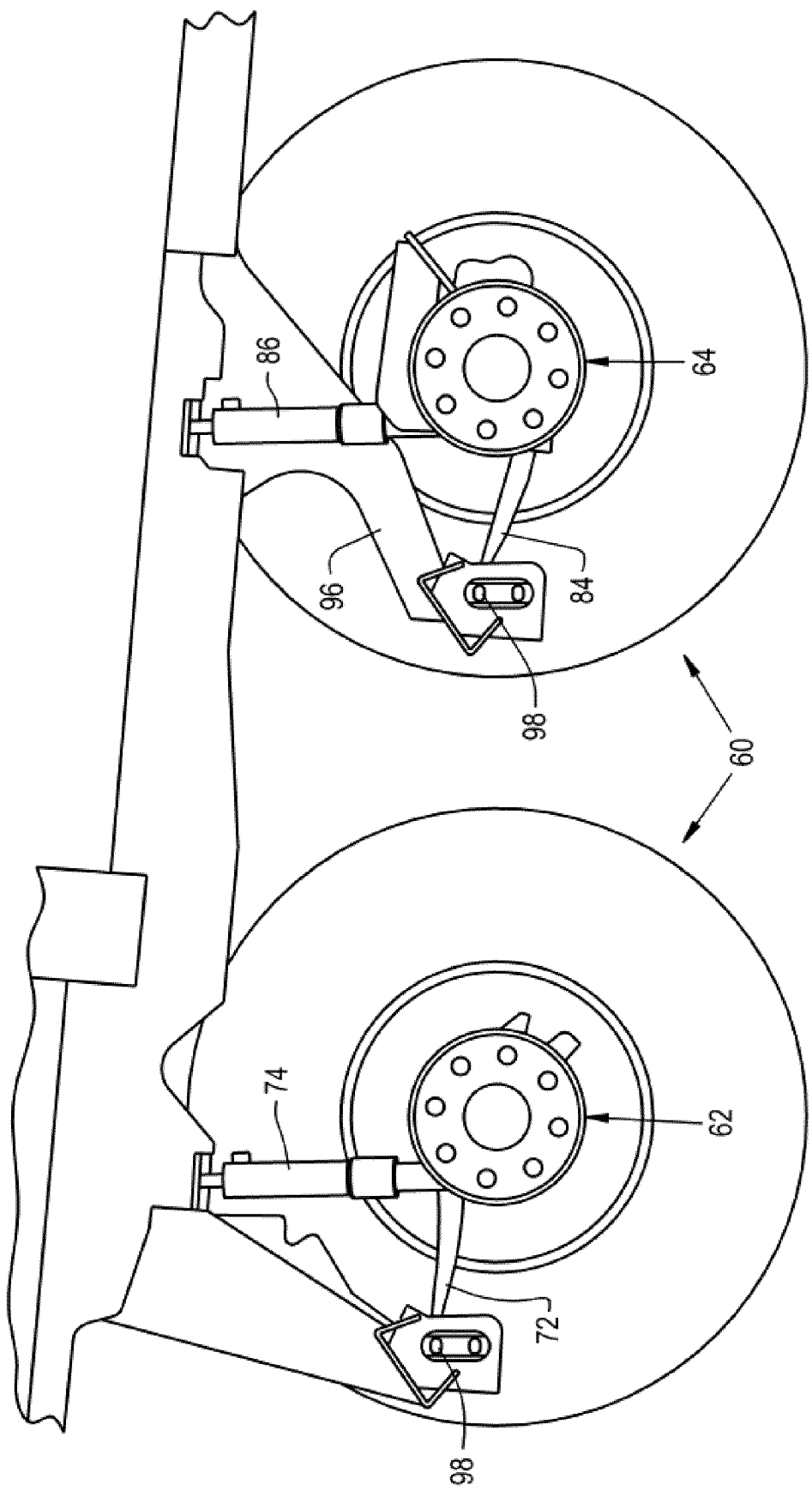
FIG. 4 is a side view of the axle arrangement shown in FIGS. 2 and 3.

Referring now to the drawings, and more particularly to FIG. 1, there is shown a perspective cutaway view showing the internal workings of a large square baler 10. Baler 10 includes a chassis 11 carrying a number of baler components (described below), and operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a feeding channel 22 to form a wad of crop material. The packer tines 20 intertwine the crop together and pack the crop within the feeding channel 22. Feeding channel 22 and packer tines 20 function as the first stage for crop compression. Once the pressure in the feeding channel 22 reaches a predetermined sensed value, a stuffer unit 24 moves the wad of crop from the feeding channel 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit.

According to an aspect of the present invention, and referring now to FIGS. 2-5, the agricultural baler 10 includes an axle arrangement 60 coupled with the chassis 11. The axle arrangement 60 includes a first axle 62, a second axle 64 and a hydraulic circuit 66 associated with each of the first axle 62 and second axle 64.

The first axle 62 includes a first end 68 and a second end 70. The first end 68 is coupled with the chassis 11 by a first leaf spring 72 and a generally vertically arranged first hydraulic cylinder 74. The second end 70 is coupled with the chassis 11 by a second leaf spring 76 and a generally vertically arranged second hydraulic cylinder 78.

The second axle 64 includes a first end 80 and a second end 82. The first end 80 is coupled with the chassis 11 by a first leaf spring 84 and a generally vertically arranged first hydraulic cylinder 86. The second end 82 is coupled with the chassis 11 by a second leaf spring 88 and a generally vertically arranged second hydraulic cylinder 90.

The hydraulic circuit 66 interconnects the first hydraulic cylinder 74 on the first axle 62 with the first hydraulic cylinder 86 on the second axle 64. The hydraulic circuit 66 also fluidly interconnects the second hydraulic cylinder 78 on the first axle 62 with the second hydraulic cylinder 90 on the second axle 64. The hydraulic circuit 66 creates a virtual pivot point between the first axle and the second axle, such that the first hydraulic cylinder 74 on the first axle 62 acts together with the first hydraulic cylinder 86 on the second axle 64. Likewise, the second hydraulic cylinder 78 on the first axle 62 acts together with the second hydraulic cylinder 90 on the second axle 64.

The volumetric capacities of the hydraulic cylinders 74, 78 on the first axle 62 can be the same or different from the volumetric capacities of the hydraulic cylinders 86, 90 on the second axle 64. For example, in one embodiment, the first hydraulic cylinder 74 and the second hydraulic cylinder 78 on the first axle 62 can have a first volumetric capacity, and the first hydraulic cylinder 86 and the second hydraulic cylinder 90 on the second axle 64 have a second volumetric capacity. The first volumetric capacity can be the same as or different from the second volumetric capacity. In the embodiment shown, the cylinders 74, 78 and 86, 90 are all configured the same. However, different configuration of the cylinders 74, 78 and 86, 90 are likewise possible.

Figure 5:
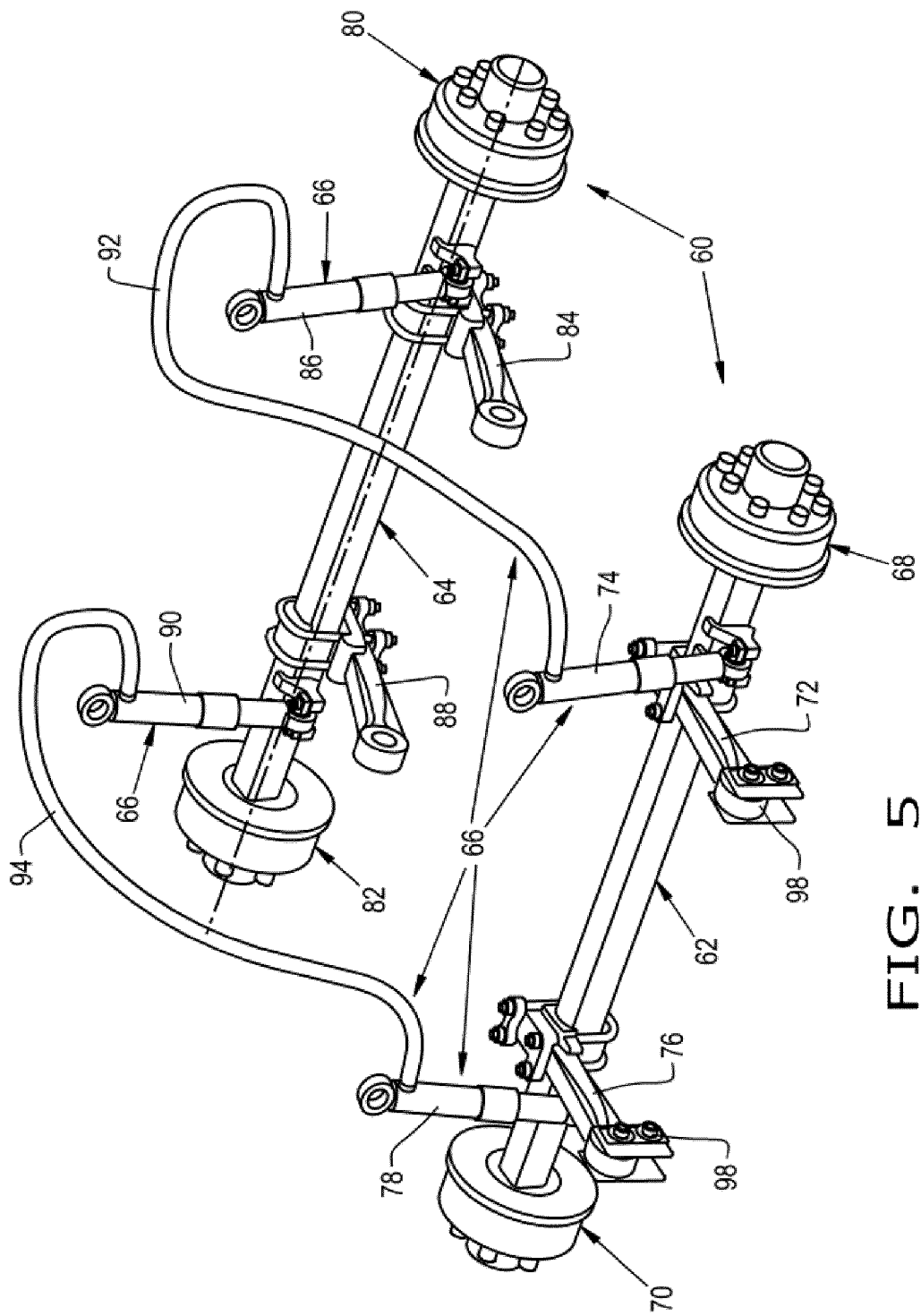
FIG. 5 is a perspective top view of the front and second axles on the axle arrangement shown in FIGS. 2 through 4.

In one embodiment of the invention, the hydraulic circuit 66 includes the cylinders 74, 78 on the first axle 62, the cylinders 86, 90 on the second axle 64, a first hydraulic line 92 and a second hydraulic line 94 (FIG. 5). The first hydraulic line 92 fluidly interconnects the first hydraulic cylinder 74 on the first axle 62 with the first hydraulic cylinder 86 on the second axle 64. The second hydraulic line 94 fluidly interconnects the second hydraulic cylinder 78 on the first axle 62 with the second hydraulic cylinder 90 on the second axle 64. In other embodiments of the invention, the hydraulic circuit 66 can be differently configured.

The first hydraulic line 92 and the second hydraulic line 94 are each oversized lines and have inside diameters providing the dual functionality of a fast flow of hydraulic fluid between the respective hydraulic cylinders 74/86 and 78/90, and also act as an accumulator for hydraulic damping between the respective hydraulic cylinders. In the embodiment shown, the fluid lines 92, 94 have an inside diameter of 9.5 mm+/−0.6 mm. If bigger diameters are used, the hydraulic damping will increase correspondingly.

In another embodiment of the invention, the feeding channel 22 defines a structural member which is coupled with the chassis 11. This is in contrast with conventional designs, wherein the feeding channel 22 is a non-structural component made of light metal which directs the crop into the main bale chamber 26. The first leaf spring 72 and the second leaf spring 76 of the first axle 62 are pivotally coupled with the feeding channel 22 (FIGS. 2-4), and thereby indirectly coupled to the chassis 11 by way of the feeding channel 22. The first axle 62 can be mounted rearwardly of the feeding channel 22, thereby lowering an effective axle height of the axle arrangement 60.

In the embodiment of the invention shown in the drawings, each leaf spring 72, 76 on the first axle 62, and each leaf spring 84, 88 on the second axle 64, are generally horizontally arranged leaf springs. It may be possible in other applications, however, to arrange the leaf springs other than horizontally. Moreover, in the embodiment of the invention shown in the drawings, each of the leaf springs provide lateral stabilization of the respective first axle 62 or second axle 64. It may be possible in other applications, however, to provide the lateral support with other structure, such as a tie rod extending between the chassis 11 and the respective front or second axle 62, 64.

Similar to the structural configuration of the feeding channel on the first axle 62, the baler 10 can also include a rear structural member 96 which is coupled with and extends downwardly from the chassis 11. The first leaf spring 84 and the second leaf spring 88 of the second axle 64 are pivotally coupled with the rear structural member 96 in a manner such that the second axle 64 is mounted rearwardly of the rear structural member 96, thereby lowering an effective axle height of the axle arrangement 60.

In the embodiment shown in the drawings, each of the leaf springs 72, 76, 84 and 88 is coupled with the chassis 11 at a selectively adjustable connection point 98, thereby providing the baler 10 with a substantially constant working height from the ground, regardless of the diameter of the tires used on the baler. For example, an operator may want to use tires of a selected diameter for whatever reason. The adjustable connection points 98 allow the working height of the baler 10 to remain the same, regardless of the selected tire diameter. Each connection point 98 is a mounting hole at a different vertical height, thus allowing the adjustability of the working height of the baler 10. However, in other embodiments of the invention, the baler 10 may not include this vertical height adjustment.

During operation of the baler 10, crop is fed via the feeding channel 22 into the main bale chamber 26. The plunger 30 reciprocates back and forth during compression cycles within the main bale chamber 26 to produce bales which are ejected from the rear of the baler 10. As the baler 10 traverses over uneven or rough ground, the front and rear tires carried by the front and second axles 62 and 64 move in relation to each other. For example, as the front right tire encounters a rock, clod of dirt, etc, it moves upward which causes compression of the piston within the second hydraulic cylinder 78 of the first axle 62. Movement of the piston within the cylinder 78 pushes the hydraulic fluid out of the cylinder 78, through the second hydraulic line 94, and into the second hydraulic cylinder 90 on the second axle 64. The right rear tire thus moves in unison in a downward direction. The same type of movement occurs between the wheels on the left side of the baler too.

In the embodiment shown and described above, the axle arrangement 60 is in the form of a tandem axle arrangement, including the first axle 62 and the second axle 64. The first axle 62 is configured as the front axle, and the second axle 64 is configured as the rear axle. However, it may be possible to configure the axle arrangement of the present invention with more than two axles. For example, it may be possible to configure the axle arrangement of the present invention with 3 axles, with the third axle also coupled to the chassis 11. Thus, the concepts of the present invention can be extended to an axle arrangement with two or more axles.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
a chassis;
a main bale chamber;
an axle arrangement coupled with the chassis, the axle arrangement comprising:

a first axle with a first end and a second end, the first end being coupled with the chassis by a first leaf spring mounted at a first location on the first axle and a generally vertically arranged first hydraulic cylinder mounted at a second location on the first axle, the second location being spaced from the first location, the second end being coupled with the chassis by a second leaf spring mounted at a third location on the first axle and a generally vertically arranged second hydraulic cylinder mounted at a fourth location on the first axle, the fourth location being spaced from the third location;

a second axle with a first end and a second end, the first end being coupled with the chassis by a first leaf spring mounted at a first location on the second axle and a generally vertically arranged first hydraulic cylinder mounted at a second location on the second axle, the the second location being spaced from the first location, the second end being coupled with the chassis by a second leaf spring mounted at a third location on the second axle and a generally vertically arranged second hydraulic cylinder mounted at a fourth location on the second axle, the fourth location being spaced from the third location; and a hydraulic circuit fluidly interconnecting the first hydraulic cylinder on the first axle with the first hydraulic cylinder on the second axle, and fluidly interconnecting the second hydraulic cylinder on the first axle with the second hydraulic cylinder on the second axle.

2. The agricultural baler of claim 1, wherein the hydraulic circuit creates a virtual pivot point between the first axle and the second axle, such that the first hydraulic cylinder on the first axle acts together with the first hydraulic cylinder on the second axle, and the second hydraulic cylinder on the first axle acts together with the second hydraulic cylinder on the second axle.

3. The agricultural baler of claim 1, wherein the hydraulic circuit comprises:

a first hydraulic line fluidly interconnecting the first hydraulic cylinder on the first axle with the first hydraulic cylinder on the second axle; and a second hydraulic line fluidly interconnecting the second hydraulic cylinder on the first axle with the second hydraulic cylinder on the second axle.

4. The agricultural baler of claim 3, wherein the first hydraulic line and the second hydraulic line are each oversized lines providing fast flow of hydraulic fluid between the first and second hydraulic cylinders, respectively.

5. The agricultural baler of claim 3, wherein the first hydraulic line and the second hydraulic line are each oversized lines providing a dual functionality of fast flow of hydraulic fluid between the first and second hydraulic cylinders, respectively, and acting as an accumulator for hydraulic damping.

6. The agricultural baler of claim 1, further comprising a pickup unit and a feeding channel for receiving crop from the pickup unit, the feeding channel defining a structural member which is coupled with the chassis, and wherein the first leaf spring and the second leaf spring of the first axle are pivotally coupled with the feeding channel, and thereby indirectly coupled to the chassis by way of the feeding channel.

7. The agricultural baler of claim 6, wherein the first axle is mounted rearwardly of the feeding channel, thereby lowering an effective axle height of the axle arrangement.

8. The agricultural baler of claim 1, further comprising a rear structural member which is coupled with and extends downwardly from the chassis, and wherein the first leaf spring and the second leaf spring of the second axle are pivotally coupled with the rear structural member in a manner such that the second axle is mounted rearwardly of the rear structural member, thereby lowering an effective axle height of the axle arrangement.

9. The agricultural baler of claim 1, wherein the first hydraulic cylinder and the second hydraulic cylinder on the first axle have a first volumetric capacity, and the first hydraulic cylinder and the second hydraulic cylinder on the second axle have a second volumetric capacity, and wherein the first volumetric capacity is the same as or different from the second volumetric capacity.

10. The agricultural baler of claim 1, wherein each of the leaf springs of the first and second axles is a generally horizontally arranged leaf spring.

11. The agricultural baler of claim 1, wherein each of the leaf springs of the first and second axles provides lateral stabilization of a respective one of the first axle and the second axle.

12. The agricultural baler of claim 1, wherein each of the leaf springs of the first and second axles is coupled with the chassis at a selectively adjustable connection point, thereby providing the baler with a substantially constant working height from the ground.

13. The agricultural baler of claim 12, wherein each selectively adjustable connection point comprises a mounting hole arranged at a different vertical height relative to a height of the baler.

14. The agricultural baler of claim 1, wherein each of the first hydraulic cylinder and the second hydraulic cylinder of the first axle and the second axle is coupled directly to the first axle and the second axle, respectively.

* * * * *